United States Patent
Yamada et al.

[15] 3,688,002
[45] Aug. 29, 1972

[54] PROCESS FOR PRODUCING ACRYLONITRILE OR METHACRYLONITRILE

[72] Inventors: Keisho Yamada; Sumio Umemura; Kyoji Ohdan, all of Ube; Mikio Hidaka, Shimonoseki; Kazuo Fukuda; Masao Sawazi, both of Ube, all of Japan

[73] Assignee: Ube Industries, Ltd., Yamaguchi-ken, Japan

[22] Filed: July 9, 1970

[21] Appl. No.: 53,636

[52] U.S. Cl..............................................260/465.3
[51] Int. Cl......................C07c 121/32, C07c 121/02
[58] Field of Search...................................260/465.3

[56] References Cited

UNITED STATES PATENTS

| | | |
|---|---|---|
| 3,269,957 | 8/1966 | Bethell................260/465.3 X |
| 3,338,952 | 8/1967 | Callahan et al.........260/465.3 |
| 3,471,545 | 10/1969 | Giordano et al........260/465.3 |

*Primary Examiner*—Joseph P. Brust
*Attorney*—Sherman and Shalloway

[57] ABSTRACT

Acrylonitrile or methacrylonitrile of high purity is prepared with good selectivity by ammoxidation of propylene or isobutylene at 350—600°C. using a solid oxidation catalyst consisting essentially (A) bismuth antimonate having an antimony-bismuth atomic ratio of about 1 : 1 and (B) a salt of molybdic acid with a metal of Group I$b$, II$a$, II$b$ or VIII of the periodic table, manganese, lead or tin, for example barium molybdate, calcium molybdate, zinc molybdate and iron molybdate, in which the weight ratio of bismuth antimonate (A) to molybdate (B) is from 95 : 5 to 10 : 90.

7 Claims, No Drawings

PROCESS FOR PRODUCING ACRYLONITRILE OR METHACRYLONITRILE

This invention relates to a process for producing acrylonitrile or methacrylonitrile by ammoxidation of propylene or isobutylene, and more specifically, to a process for producing acrylonitrile or methacrylonitrile at high selectivity by reacting propylene or isobutylene, ammonia and oxygen in the presence of a catalyst of a novel composition.

It is already known to produce acrylonitrile from propylene by the so-called ammoxidation process in which propylene is reacted in a gaseous phase with ammonia and molecular oxygen in the presence of a catalyst at high temperatures. A number of catalysts to effect this reaction have been proposed heretofore. One of the typical catalysts is described in U.S. Pat. No. 2,904,580, and is selected from the group consisting of bismuth, tin and antimony salts of phosphomolybdic acid and molybdic acid, and bismuth phosphotungstate. When this catalyst is used, by-products comprising such compounds as acetonitrile and hydrogen cyanide are yielded each in an amount of about 10 percent based on the acrylonitrile formed. Therefore, not only the selectivity of acrylonitrile is reduced (the U.S. Pat. states that the conversion of acrylonitrile based on carbon is 52.8 percent at the maximum), but also it becomes difficult to produce high purity acrylonitrile with commercial advantage by removing these by-products from acrylonitrile. Furthermore, application of this catalyst to the production of metha-crylonitrile by ammoxidation of isobutylene has resulted only in unsatisfactory selectivity and purity.

Thus, the catalysts used heretofore in the production of acrylonitrile or methacrylonitrile by the ammonxidation process generally lead to low selectivity of acrylonitrile or methacrylonitrile, and have not proved satisfactory from a commercial standpoint.

It has now been found that a catalyst comprising bismuth antimonate with an antimony-bismuth atomic ratio of about 1 : 1 and a molybdate hereinbelow described gives acrylonitrile or methacrylonitrile at high selectivities in the ammoxidation of propylene or isobutylene, controlling the formation of by-products such as acetonitrile, propionitrile, hydrogen cyanide, acrolein, methacrolein, carbon monoxide and carbon dioxide within very small amounts.

According to the present invention, there is provided a process for producing acrylonitrile or methacrylonitrile which comprises contacting propylene or isobutylene, ammonia and oxygen in a gaseous phase with a solid oxidation catalyst at a temperature ranging from 350°C. to 600°C., said solid oxidation catalyst consisting essentially of (A) bismuth antimonate having an antimony-bismuth atomic ratio of about 1 : 1 and (B) a salt of molybdic acid with a metal of Group IB of the periodic table, a metal of Group IIa, a metal of Group IIb, a metal of Group VIII, manganese, lead or tin, and the weight ratio of said bismuth antimonate (A) to molybdate (B) being in the range of 95 : 5 to 10 : 90.

The bismuth antimonate, component (A) of the catalyst of the invention, is a compound expressed by the chemical formula BiSbO₄ and having an antimoby-bismuth atomic ratio of substantially 1 : 1. Bismuth antimonate includes, besides the compound BiSbO₄, the compounds expressed by the chemical formulas Bi(SbO₃)₃ and (BiO)₃SbO₄ according to the antimony-bismuth atomic ratio. But the use of such bismuth antimonate compounds outside the scope of the present invention does not achieve the high selectivity of acrylonitrile which the catalyst of the invention exhibits. Of course, the component (A) of the catalyst of the invention may contain minor amounts, for instance, less than about 10 percent by weight based on BiSbO₄, of the compounds expressed by the chemical formulas Bi(SbO₃)₃ and (BiO)₃SbO₄ and/or antimony oxides, bismuth oxides, and the like as inactive ingredients.

The component (B) of the catalyst of the present invention is a salt of molybdic acid with a metal of Group IB of the periodic table (Werner-Pfeiffer), a metal of Group IIA, a metal of Group IIB, a metal of Group VIII, manganese, lead or tin. The metal of Group IB includes copper and silver; the metal of Group IIA, magnesium, calcium, and barium; the metal of Group IIB, zinc, cadmium, and mercury; and the metal of Group VIII, iron, cobalt and nickel. Particularly preferred molybdates are expressed by the following general formulas

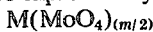

wherein M is a metal of Group IB, a metal of Group IIA, a metal of Group IIB, a metal of Group VIII, manganese, lead or tin, and $m$ is a number equal to the atomic valency of the metal.

Suitable examples include Ag₂MoO₄, BaMoO₄, BaMo₃O₁₀, CaMoO₄, CaMo₃O₁₀, ZnMoO₄, CdMoO₄, Fe₂(MoO₄)₃, CoMo₃O₁₀, MnNoO₄, and PbMoO₄. The molybdate as the component (B) may safely contain, besides thd molybdate described above, other molybdates, molybdenum oxides or oxides of the metals used in minor amounts, for instance, less than about 20 percent weight based on the molybdate described hereinabove.

The catalyst components (A) and (B) of the invention when used singly, leads to a low selectivity of acrylonitrile or methacrylonitrile from propylene or isobutylene; but the use of a combination of these two components makes it possible to obtain acrylonitrile or methacrylonitrile at a selectivity of as high as more than 90 percent. In view of this, a suitable weight ratio of the bismuth antimonate (A) to the molybdate (B) is $$A : B = 95 : 5 \sim 10 : 90,$$

preferably $$A : B = 90 : 20 \sim 20 : 80.$$

Ratios outside the above-specified range cause higher ratios of side-reactions, and result in low selectivity of acrylonitrile or methacrylonitrile as the principal product.

The method of producing the catalysts used in the present invention is not particularly restricted, and any methods can be employed insofar as the above conditions are fulfilled.

One preferred example of the method of producing this catalyst will be described below.

Bismuth antimonate, the component (A) of the catalyst used in the present invention, can be prepared, for instance by the following procedure.

Antimony trichloride is dissolved in concentrated hydrochloric acid, and on addition of water, hydrolysis occurs to form a precipitate. Further addition of aqueous ammonia leads to the formation of antimony trioxide. A solution of bismuth nitrate in nitric acid is added to the antimony trioxide with the antimony-bismuth atomic ratio being adjusted to about 1 : 1, and the mixture is evaporated to dryness untill the evolution of ammonium nitrate and nitrogen dioxide ceases, followed by calcination to form bismuth antimonate. When the ratio of the antimony compounds, such as antimony trichloride, to the bismuth compound, such as bismuth nitrate, is varied in the above procedure, compounds consisting of bismuth, antimony and oxygen which can be expressed by the chemical formulas $BiSbO_4$, $Bi(SbO_3)_{33}SbO_4$, etc. are formed. If the reaction is carried out while adjusting the antimony-bismuth ratio substantially to 1 : 1, the preferred $BiSbO_4$ can be obtained. The bismuth antimonate $BiSbO_4$ may contain minor amounts of such compounds as $Bi(SbO_3)_3$ and $(BiO)_3SbO_4$. It is generally preferred that the calcination should be performed at a temperature in the range of 400° to 1,100°C., especially 540° to 700°C. for a period of 5 to 30 hours, especially 5 to 20 hours. TEmperatures above this range are undesirable because the specific surface area and activity of the catalyst are reduced.

Molybdate, the component (B) of the catalyst used in the present invention, can be prepared, for instance, by the following procedure.

An aqueous solution of a nitrate of a metal selected from the group consisting of metals of Group IB, metals of Group IIA, metals of Group IIB, metals of Group VIII, manganese, lead and tin is added to an aqueous solution of ammonium molybdate, and the mixture is evaporated to dryness until there is no evolution of ammonium nitrate and nitrogen dioxide, followed by calcination to form the desired molybdate. Various molybdates can be obtained by varying the ratio of the ammonium molybdate and the metal nitrate. It is preferred in the present invention that the ratio of the ammonium molybdate to the metal nitrate should be chosen so as to form a molybdate expressed by the following general formulas

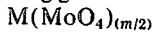
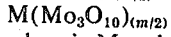

wherein M and m are as defined hereinabove.
Preferably, the calcination of the molybdate should be performed at a temperature in the range of 300° to 650°C., especially 500° to 600°C. for a period of 5 to 30 hours, especially 5 to 20 hours, Temperatures above the specified range are undesirable because the specific surface area of the molybdate becomes small and the activity of the catalyst is reduced.

Particularly preferred compounds as the component (B) of the catalyst used in the invention are listed below in the order of importance.

a. Salts of molybdate with metals of Group IIA, such as barium molybdate (for instance, $BaMoO_4$, $BaMo_3O_{10}$ or calcium molybdate (for instance, $CaMoO_4$, $CaMo_3O_{10}$);
b. Zinc molybdate (for instance $ZnMoO_4$); and
c. Iron molybdate (for instance, $Fe_2(MoO_4)_3$).

The bismuth antimonate and molybdate so obtained are kneaded in a customary manner together with water in a mill for instance, to change into a paste form. The paste-like product is dried and used as the catalyst of the present invention.

The catalyst is used either alone or in conjunction with a carrier. As the carrier, there can be used materials which can give good results in the reaction contemplated by the present invention, and the examples are silica, alumina, alumina-silica, silicates, carborundum. The amount of such carrier is optional, for instance, 10 – 90 percent by weight based on the total amount of the carrier and the catalyst.

The catalyst used in the invention generally has a specific surface area of 1 to 3 m²/g, although it differs depending upon the combination of the catalyst components and the conditions for the preparation of the catalyst.

The size and shape of the catalyst particles are not especially restricted, and any desired sizes and shapes can be chosen according to the condition in which the catalyst is used. Sufficient mechanical strength can be imparted to the catalyst by using the molding method usually employed, and the activity of the catalyst does not change according to the type of the molding method.

According to the process of the invention, the ammoxidation of propylene or isobutylene can be carried out in accordance with the known process conditions except using the catalyst hereinabove described.

Propylene or isobutylene need not be highly pure, but if possible, the co-presence of a gas, such as butenes and acetylenes, which is substantially active under the reaction conditions should better be avoided. Oxygen to be contacted with propylene or isobutylene may be pure oxygen, but may be air since it need not be of high purity. The ratio of oxygen to be fed is suitably in the range of 0.8 – 3 mol times, especially 1.0 – 2 mol times, based on propylene or isobutylene. The ratio of ammonia suitably ranges from 0.5 – 3 mol times, especially 0.8 – 1.2 mol times, based on propylene or isobutylene. In addition to the propylene or isobutylene, oxygen and ammonia, the use of a dilute gas is also beneficial. Dilute gases that can be used in the invention should be substantially inert to the reaction contemplated by the present invention, and include, for instance, water vapor, nitrogen, carbon dioxide, ethane, propane, butane, and isobutane. Such dilute gas can be used in an amount of at least 0.5 mol time that of propylene or isobutylene. Of the dilute gases, water vapor not only contributes to an increase in the selectivity of acrylonitrile or methacrylonitrile as the final product, but also serves to prolong the time during which the catalyst remains active.

The reaction temperature employed in the present invention ranges from 350°C. to 600°C., preferably from 400° to 500°C. The contact time is 0.5 – 40 seconds, preferably 2 – 20 seconds. The reaction pressure may be normal atmospheric pressure, but slightly elevated or reduced pressure can also be employed.

The process of the present invention can be performed using a gaseous-phase reaction apparatus of the type known per se in which the catalyst is used as fixed bed, moving bed, or fluidized bed. The use of a reaction apparatus of the fixed bed type is particularly advantageous from the standpoint of the life of the catalyst.

The recovery of acrylonitrile or methacrylonitrile as the final product can be effected by contacting the gas from the outlet of the reaction apparatus with cold water or other solvent for the acrylonitrile or methacrylonitrile to extract acrylonitrile or methacrylonitrile, and then subjecting it to fractional distillation. Prior to extracting acrylonitrile or methacrylonitrile, the outlet gas may be treated with an aqueous acid solution, for instance, aqueous sulfuric acid solution, so as to neutralize excess ammonia. According to the process of the present invention, acrylonitrile or methacrylonitile is obtained at very high selectivity from propylene or isobutylene, and the amounts of by-products such as acetonitrile, propionitrile, acrolein, hydrogen cyamide, methacrolein, carbon monoxide, and carbon dioxide are small. The purification step can therefore be simplified as compared with the conventional process, and high purity acrylonitrile or methacrylonitrile can be provided at low cost.

In addition, the process of the invention has a marked advantage that with the catalyst used in the invention, the high selectivity of acrylonitrile or methacrylonitrile does not change even when the conversion of propylene or isobutylene is raised to 90 percent for instance.

The invention will be described further by the following examples which are intended to be illustrative rather than limitative. In each of the examples, the conversion (percent) and selectivity (percent) are defined by the following equations.

$$\text{Conversion}(\%) = \frac{\text{Moles of consumed propylene or isobutylene}}{\text{Moles of fed propylene or isobutylene}} \times 100$$

$$\text{Selectivity}(\%) = \frac{\text{Moles of the product calculated as the starting propylene or isobutylene}}{\text{Moles of consumed propylene or isobutylene}} \times 100$$

EXAMPLE 1

232 gr. of antimony trichloride ($SbCl_3$) was dissolved in 24 cc or concentrated hydrochloric acid and on addition of water, hydrolysis occurs to form a precipitate. Addition of aqueous ammonia (76.6 cc) led to the formation of antimony trioxide, which was filtered, and washed with water. The antimony trioxide so obtained was put into an evaporation dish,, and a solution of 492 gr. of bismuth nitrate ($Bi(NO_3)_3 \cdot 5H_2O$) in 92 cc of 62 percent nitric acid and 92 cc of water was added, followed by evaporation to dryness until the evolution of ammonium nitrate and nitrogen dioxide ceased. The solid matter obtained was packed into a U-shaped stainless steel pipe, and calcined for 16 hours at 700°C. by heating from outside while passing air thereinto. Bismuth antimonate having an antimony-bismuth atomic ratio of 1 : 1 was obtained.

A solution of 218 gr. of barium nitrate [$Ba(NO_3)_2$] in 1,200 cc of water was added to a solution of 443 gr. of ammonium molybdate [$(NH_4)_6Mo_7O_{24} \cdot 4H_2O$] in 1,500 cc of water, and the mixture was evaporated to dryness on an evaporation dish until the evolution of ammonium nitrate and nitrogen dioxide was ceased. The solid matter obtained was packed into a U-shaped stainless steel pipe, and calcined for 16 hours at 540°C. by heating from outside while passing air thereinto. Barium molybdate having a molybdenum-barium atomic ratio of 3 : 1 was obtained. The product was a compound expressed by the formula $BaMo_3O_{10}$.

The bismuth antimonate and barium molybdate so obtained were mixed at a weight ratio of 50 : 50, and the mixture was kneaded together with water in a mill. The paste-like mixture obtained was dried for 16 hours at 130°C., and the sizes of the resulting particles were adjusted to 14 – 20 mesh (on Tyler's standard sieve) so as to prepare a catalyst.

Eight cubic centimeters of the catalyst so obtained was packed into a U-shaped stainless steel reaction tube having an inner diameter of 6 mm. A gaseous mixture of propylene, ammonia, water vapor and air at a ratio of 1 : 1 : 2 : 7.5 was introduced into the reaction tube at a flow rate of 80.5 cc/minute, and catalytically reacted at a temperature of 470°C. The contact time was 5.97 seconds.

The conversion of propylene was 47.4 percent, and the selectivity of each product was as follows:

| | |
|---|---|
| Acrylonitrile | 90.4 % |
| Acetonitrile | 4.0 % |
| Hydrogen cyanide | 0.3 % |
| Acrolein | 1.2 % |

Propionitrile and acetone were formed in trace amounts.

EXAMPLE 2

The ammoxidation of isobutylene was performed under the same conditions as set forth in Example 1 except that isobutylene was used instead of the propylene.

The conversion of isobutylene was 54.9 percent, and the selectivity of each product was as follows:

| | |
|---|---|
| Methacrylonitrile | 88.3 % |
| Acetonitrile | 4.5 % |
| Hydrogen cyanide | 0.6 % |
| Methacrolein | 0.9 % |

EXAMPLES 3 to 6

The ammoxidation of propylene was performed under the same conditions as set forth in Example 1 except that the ratio of bismuth antimonate to barium molybdate in the catalyst was varied as indicated in Table 1 below. The results obtained are shown in Table 1.

TABLE 1

| | Component ratio of the catalyst (wt.%) | | Conversion of propylene (%) | Selectivities of the reaction products (%) | | | |
|---|---|---|---|---|---|---|---|
| Ex. | Bismuth antimonate | Barium molybdate | | Acrylonitrile | Acetonitrile | Hydrogen cyanide | Acrolein |
| 3 | 30 | 70 | 54.6 | 84.6 | 4.6 | 0.7 | 1.6 |
| 4 | 40 | 60 | 49.1 | 88.6 | 3.9 | 1.0 | 1.0 |
| 5 | 60 | 40 | 45.7 | 92.0 | 3.8 | 0.9 | 1.0 |
| 6 | 70 | 30 | 43.3 | 87.0 | 4.1 | 0.7 | 1.8 |

The formation of propionitrile and acetone was only in a trace amount.

EXAMPLE 7

The ammoxidation of isobutylene was performed under the same conditions as set forth in Example 5 except that isobutylene was used instead of the propylene.

The conversion of isobutylene was 52.7 percent, and the selectivity of each product was as follows:

| | |
|---|---|
| Methacrylonitrile | 89.2 % |
| Acetonitrile | 3.2 % |
| Hydrogen cyanide | 0.7 % |
| Methacrolein | 1.1 % |

EXAMPLE 8

The ammoxidation of propylene was performed under the same conditions as set forth in Example 5 except that a gaseous mixture of propylene, ammonia, water vapor, and air at a molar ratio of 1 : 1 : 2 : 7.5 was introduced at a flow rate of 11 cc/minute at a temperature of 450°C. with a contact time adjusted to 4.17 seconds.

The conversion of propylene was 41.5 percent, and the selectivity of each product was as follows:

| | |
|---|---|
| Acrylonitrile | 91.9 % |
| Acetonitrile | 3.5 % |
| Hydrogen cyanide | 1.2 % |
| Acrolein | 1.3 % |

The formation of propionitrile and acetone was only in a trace amount.

EXAMPLE 9

Calcium molybdate ($CaMo_3O_{10}$) having a molybdenum-calcium atomic ratio of 3 : 1 was prepared in the same manner as set forth in Example 1 except that calcium nitrate [$Ca(NO_3)_2$] was used instead of the barium nitrate. The resulting calcium molybdate was mixed with bismuth antimonate ($BiSbO_4$) obtained in the same manner as set forth in Example 1, at a weight ratio of 70 : 30 to form a catalyst in accordance with the procedure set forth in Example 1.

The ammoxidation of propylene was performed using the catalyst so obtained under the same conditions as set forth in Examples 1.

The conversion of propylene was 60.4 percent, and the selectivity of each product was as follows:

| | |
|---|---|
| Acrylonitrile | 90.9 % |
| Acetonitrile | 3.7 % |
| Hydrogen cyanide | 1.4 % |
| Acrolein | 1.2 % |

The formation of propionitrile and acetone was only in a trace amount.

COMPARATIVE EXAMPLE 1

The ammoxidation of propylene was performed under the same conditions as set forth in Example 1 using 15 cc of a catalyst [14–20 mesh (on Tyler's standard Sieve) particles of $BiSbO_4$ alone] obtained in the same manner as set forth in Example 1 except that barium molybdate was not added.

The conversion of propylene was 25.5 percent, and the selectivity of acrylonitrile was about 10.9 percent. The formation of acetonitrile, hydrogen cyanide, acrolein and propionitrile was only in trace amounts.

COMPARATIVE EXAMPLE 2

The ammoxidation of propylene was performed in the same manner as set forth in Example 1 except that 15 cc of a catalyst [14–20 mesh (on Tyler's standard Sieve) particles of barium molybdate $BaMo_3O_{10}$ prepared in Example 1] was used. The conversion of propylene was 21.5 percent, and the selectivity of acrylonitrile was about 35.8 percent.

COMPARATIVE EXAMPLE 3

116 gr. or antimony trichloride was dissolved in 12 cc of concentrated hydrochloric acid, and on addition of water, hydrolysis occurs to form a precipitate. Further addition of 76.7 cc of aqueous ammonia led to the formation of antimony trioxide, which was filtered and washed with water. The antimony trioxide so obtained was put into an evaporation dish, and a solution of 638 gr. of bismush nitrate in 46 cc of 62 percent nitric acid was added, followed by evaporation to dryness until the evolution of nitrogen dioxide ceased. The solid matter obtained was packed into a U-shaped stainless steel pipe, and calcined for 16 hours at a temperature of 500°C. by heating from outside while passing air at a flow rate of 100 cc/minute. Bismuth antimonate [$(BiO)_3SbO_4$] having an antimony bismuth atomic ratio of 1 : 3 was obtained.

The bismuth antimonate so obtained was mixed with barium molybdate ($BaMo_3O_{10}$) at a weight ratio of 70 : 30 to form a catalyst.

The ammoxidation of propylene was performed under the same conditions as set forth in Example 1 except that the catalyst prepared above was used. The conversion of propylene was 24.4 percent, and the selectivity of acrylonitrile was 30.7 percent.

EXAMPLE 10

116 gr. of antimony trichloride ($SbCl_3$) was dissolved in 12 cc of concentrated hydrochloric acid, and on addition of water, hydrolysis occurs to form a precipitate. Further addition of 76.7 cc of aqueous ammonia led to the formation of antomony trioxide, which was filtered and washed with water. The antimony trioxide was put into an evaporation dish, and a solution of 246 gr. of bismuth nitrate $Bi(NO_3)_3$. $5H_2O$ in 46 cc of 62 percent nitric acid and 46 cc of water was added, followed by evaporation to dryness until the evolution of nitrogen dioxide ceased. The solid matter obtained was packed into a U-shaped stainless steel pipe, and calcined for 16 hours at a temperature of 700°C. by heating from outside while passing air at a flow rate of 100 cc/minute. Bismuth antimonate ($BiSbO_4$) was obtained.

A solution of 180 gr. of silver nitrate ($AgNO_3$) in 180 cc of water was added to a solution of 94 gr. of ammonium molybdate [$(NH_4)_6Mo_7O_{24}.4H_2O$] in 627 cc of water. The resulting mixture was evaporated to dryness on an evaporation dish until the evolution of ammonium nitrate and nitrogen dioxide ceased. The solid matter so obtained was packed into a U-shaped stainless steel pipe, and calcined for 16 hours at a temperature of 540°C. by heating from outside while introducing air at a flow rate of 100 cc/minute. Silver molybdate ($Ag_2MoO_4$) was obtained.

The bismuth antimonate and silver molybdate so obtained were mixed at a weight ratio of 80 : 20, and kneaded together with water in a mill. The paste-like matter obtained was dried for 16 hours at a temperature of 130°C. The sizes of the resulting particles were adjusted to 14–20 mesh (on a Tyler's standard sieve) so as to prepare a catalyst.

Eight cubic centimeters of the catalyst obtained above was packed into a U-shaped stainless steel reaction tube having an inner diameter of 6 mm. A gaseous mixture of propylene, ammonia, water vapor, and air at a molar ratio of 1 : 1 : 2 ; 7.5 was introduced into the reaction tube at a flow rate of 80.5 cc/min., and catalytically reacted at a temperature of 470°C. The contact time was 5.97 seconds.

The conversion of propylene was 40.2 percent, and the selectivity of each product was as follows:

| | |
|---|---|
| Acrylonitrile | 91.7 % |
| Acetonitrile | 3.5 % |
| Hydrogen Cyanide | 0.7 % |
| Acrolein | 1.1 % |

The formation of propionitrile and acetone was only in trace amounts.

EXAMPLE 11

The ammoxidation of isobutylene was performed under the same conditions as set forth in Example 10 except that isobutylene was used instead of the propylene.

The conversion of isobutylene was 46.2 percent, and the selectivity of each product was as follow:

| | |
|---|---|
| Methacrylonitrile | 89.8 % |
| Acetonitrile | 4.3 % |
| Hydrogen cyanide | 1.2 % |
| Methacrolein | 1.4 % |

EXAMPLES 12 to 15

The ammoxidation of propylene was performed under the same conditions as set forth in example 10 except that the ratio of bismuth antimonate (BiSbO$_4$) to the silver molybdate (Ag$_2$MoO$_4$) was varied as indicated in Table 2. The results obtained are shown in Table 2

TABLE 2

| Component ratio of the catalyst (wt.%) | | Conversion of propylene (%) | Selectivities of the reaction products (%) | | | |
|---|---|---|---|---|---|---|
| ex. BiSbO$_4$ | Ag$_2$MoO$_4$ | | acrylonitrile | acetonitrile | hydrogen cyanide | acrolein |
| 12 | 90 | 10 | 40.4 | 85.5 | 3.2 | 0.5 | 1.5 |
| 13 | 70 | 30 | 44.0 | 89.5 | 4.1 | 1.1 | 1.2 |
| 14 | 60 | 40 | 47.0 | 84.0 | 6.2 | 0.9 | 2.5 |
| 15 | 50 | 50 | 46.3 | 78.3 | 5.3 | 1.0 | 3.0 |

The formation of propylene and acetone was only in trace amounts.

EXAMPLES 16 to 20

The ammoxidation of propylene was performed under the same conditions as set forth in Example 10 except that zinc molybdate prepared in the manner mentioned below was used instead of the silver molybdate. The results obtained are shown in Table 3.

The preparation of zinc molybdate was as follows

A solution of 264 gr. of zinc nitrate [Zn(NO$_3$)$_2$·6H$_2$] in 260 cc of water was added to a solution of 157 gr. of ammonium molybdate [(NH$_4$)$_6$Mo$_7$O$_{24}$·4H$_2$O] in 1,045 cc of water. The resulting mixture was evaporated to dryness until there was no evolution of ammonium nitrate and nitrogen dioxide. The solid matter obtained was calcined under the same conditions as as employed in the preparation of the silver molybdate catalyst in Example 10. A catalyst composed of bismuth antimonate and zinc molybdate was obtained.

TABLE 3

| Component ratio of the catalyst (wt.%) | | Conversion of propylene (%) | Selectivities of the reaction products (%) | | | |
|---|---|---|---|---|---|---|
| ex. BiSbO$_4$ | ZnMoO$_4$ | | acrylonitrile | acetonitrile | hydrogen cyanide | acrolein |
| 16 | 90 | 10 | 29.0 | 85.0 | 3.7 | 0.9 | 1.1 |
| 17 | 80 | 20 | 38.8 | 88.8 | 4.8 | 1.4 | 2.2 |
| 18 | 70 | 30 | 41.0 | 84.0 | 4.7 | 1.2 | 3.0 |
| 19 | 60 | 40 | 46.5 | 87.0 | 6.1 | 1.8 | 2.5 |
| 20 | 50 | 50 | 42.1 | 75.8 | 7.2 | 1.8 | 2.8 |

The formation of propionitrile and acetone was only in trace amounts.

EXAMPLES 21 to 25

The ammoxidation of propylene was performed under the same conditions as set forth in Example 10 except that barium molybdate prepared in the manner described below was used instead of the silver molybdate. The results obtained are shown in Table 4 below.

The preparation of barium molybdate (BaMoO$_4$) was as follows

A solution of 176 gr. or barium nitrate [Ba(NO$_3$)$_2$] in 520 cc of water was added to a solution of 119 gr. of ammonium molybdate [(NH$_4$)$_6$Mo$_7$O$_{24}$·4H$_2$O] in 794 cc of water. The resulting mixture was evaporated to dryness on an evaporation dish until the evolution of ammonium nitrate and nitrogen dioxide was ceased. The solid matter obtained was calcined under the same conditions as employed in the preparation of silver molybdate in Example 10. A catalyst composed of bismuth antimonate and barium molybdate was obtained.

TABLE 4

| Component ratio of the catalyst (wt.%) | | Conversion of propylene (%) | Selectivities of the reaction products (%) | | | |
|---|---|---|---|---|---|---|
| ex. BiSbO$_4$ | BaMoO$_4$ | | acrylonitrile | acetonitrile | hydrogen cyanide | acrolein |
| 21 | 90 | 10 | 49.0 | 70.0 | 2.6 | 0.9 | 0.7 |
| 22 | 80 | 20 | 51.0 | 89.2 | 3.2 | 1.2 | 0.9 |
| 23 | 70 | 30 | 49.5 | 92.7 | 3.0 | 1.3 | 0.5 |
| 24 | 60 | 40 | 55.0 | 83.0 | 3.6 | 1.5 | 2.3 |
| 25 | 25 | 75 | 51.6 | 85.4 | 4.3 | 1.7 | 0.5 |

The formation of propionitrile and acetone was only in trace amounts.

EXAMPLE 26

The ammoxidation of isobutylene was performed using the same catalyst and under the same conditions as set forth in Example 23 except that isobutylene was used instead of the propylene.

The conversion of isobutylene was 53.2 percent, and the selectivity of each product was as follows:

| | |
|---|---|
| Methacrylonitrile | 90.2 % |
| Acetonitrile | 3.1 % |
| Hydrogen Cyanide | 0.8 % |
| Methacrolein | 1.1 % |

EXAMPLES 27 to 31

The ammoxidation of propylene was performed under the same conditions as set forth in Example 10 except that cadmium molybdate prepared in the manner mentioned below was used instead of the silver molybdate. The results obtained are shown in Table 5 below.

The preparation of cadmium molybdate ($CdMoO_4$) was as follows

A solution of 227 gr. of cadmium nitrate [$Cd(NO_3)_2 \cdot 4H_2O$)] in 230 cc of water was added to a solution of 130 gr. of ammonium molybdate [$(NH_4)_6Mo_7O_{24} \cdot 4H_2O$] in 867 cc of water The resulting mixture was evaporated to dryness on an evaporation dish until the evolution of ammonium nitrate and nitrogen dioxide was ceased. The solid matter obtained was calcined under the same conditions as employed in the preparation of silver molybdate in Example 10. A catalyst composed of bismuth antimonate and cadmium molybdate was obtained.

TABLE 5

| ex. | Component ratio of the catalyst (wt.%) | | Conversion of propylene (%) | Selectivities of the reaction products (%) | | | |
|---|---|---|---|---|---|---|---|
| | $BiSbO_4$ | $CdMoO_4$ | | acrylonitrile | acetonitrile | hydrogen cyanide | acrolein |
| 27 | 90 | 10 | 43.0 | 82.2 | 6.2 | 0.8 | 1.5 |
| 28 | 80 | 20 | 51.0 | 87.1 | 5.4 | 1.1 | 1.3 |
| 29 | 70 | 30 | 60.2 | 86.5 | 5.0 | 1.3 | 1.6 |
| 30 | 60 | 40 | 55.5 | 85.4 | 5.7 | 1.2 | 2.1 |
| 31 | 50 | 50 | 53.9 | 70.0 | 6.1 | 1.2 | 2.4 |

The formation of propionitrile and acetone was only in trace amounts.

EXAMPLES 32 to 36

The ammoxidation of propylene was performed under the same conditions as set forth in Example 10 except that calcium molybdate prepared in the manner described below was used instead of the silver molybdate and the reaction temperature instead of the silver molybdate and the reaction temperature was maintained at 450°C. The results obtained are shown in Table 6 below.

The preparation of calcium molybdate ($CaMoO_4$) was as follows

A solution of 236 gr. of calcium nitrate [$Ca(No_3)_2 \cdot 4H_2O$] in 240 cc of water was added to a solution of 177 gr. of ammonium molybdate [$(NH_4)_6Mo_7O_{24} \cdot 4H_2O$] in 1,180 cc of water. The resulting mixture was evaporated to dryness on an evaporation dish until the evolution of ammonium nitrate and nitrogen dioxide was ceased. The solid matter obtained was calcined under the same conditions as employed in the preparation of the silver molybdate in Example 10. A catalyst composed of bismuth antimonate and calcium molybdate was obtained.

TABLE 6

| ex. | Component ratio of the catalyst (wt.%) | | Conversion of propylene (%) | Selectivities of the reaction products (%) | | | |
|---|---|---|---|---|---|---|---|
| | $BiSbO_4$ | $CaMoO_4$ | | acrylonitrile | acetonitrile | hydrogen cyanide | acrolein |
| 32 | 90 | 10 | 27.5 | 79.0 | 3.7 | 1.4 | 0.3 |
| 33 | 80 | 20 | 36.9 | 87.1 | 3.3 | 1.5 | 0.7 |
| 34 | 70 | 30 | 44.0 | 90.3 | 3.5 | 1.3 | 0.4 |
| 35 | 60 | 40 | 40.0 | 86.0 | 3.9 | 1.1 | 0.4 |
| 36 | 50 | 50 | 41.2 | 80.5 | 3.5 | 1.3 | 0.6 |

The formation of propionitrile and acetone was only in trace amounts.

EXAMPLE 37

The ammoxidation of isobutylene was performed using the same catalyst and under the same conditions as set forth in Example 34 except that isobutylene was used instead of propylene.

The conversion of isobutylene was 46.3 percent, and the selectivity of each product was as follows:

| | |
|---|---|
| Methacrylonitrile | 87.6 % |
| Acetonitrile | 4.2 % |
| Hydrogen cyanide | 1.4 % |
| Methacrolein | 1.3 % |

EXAMPLES 38 to 42

The ammoxidation of propylene was performed under the same conditions as set forth in Example 10 except that lead molybdate prepared used instead of the silver molybdate, and a gaseous mixture consisting of propylene, ammonia, water vapor, and air at a ratio of 1 : 1 : 2 : 5 was reacted at a flow rate of 90 cc/ minute with a contact time of 5.33 seconds. The results obtained are shown in Table 7 below.

The preparation of lead molybdate ($PbMoO_4$) was as follows

A solution of 181 gr. of lead nitrate [$Pb(NO_3)_2$] in 180 cc of water was added to a solution of 96.4 gr. of ammonium molybdate [$(NH_4)_6Mo_7O_{24} \cdot 4H_2O$] in 642 cc of water. The resulting mixture was evaporated to dryness on an evaporation dish until the evolution of ammonium nitrate and nitrogen dioxide was ceased. The solid matter obtained was calcined under the same conditions as employed in the preparation of the silver molybdate in Example 10. A catalyst composed of bismuth antimonate and lead molybdate was obtained.

TABLE 7

| ex. | Component ratio of the catalyst (wt.%) | | Conversion of propylene (%) | selectivities of the reaction products (%) | | | |
|---|---|---|---|---|---|---|---|
| | $BiSbO_4$ | $PbMoO_4$ | | acrylonitrile | acetonitrile | hydrogen cyanide | acrolein |
| 38 | 90 | 10 | 35.6 | 71.5 | 6.3 | 0.8 | 2.3 |
| 39 | 80 | 20 | 37.5 | 85.5 | 5.4 | 2.1 | 2.5 |
| 40 | 70 | 30 | 46.1 | 88.8 | 5.2 | 2.4 | 1.7 |
| 41 | 60 | 40 | 45.5 | 85.3 | 4.6 | 1.9 | 1.9 |
| 42 | 50 | 50 | 47.0 | 79.3 | 5.0 | 1.0 | 1.6 |

The formation of propionitrile and acetone was only in trace amounts.

EXAMPLES 43

A solution of 58.8 gr. of ammonium molybdate [$(NH_4)_6Mo_7O_{24}\cdot 4H_2O$] in 177 cc of water was heated at a temperature of 80° to 9020 C., followed by addition of a solution of 95.4 gr. of manganese nitrate [$Mn(NO_3)_2\cdot 6H_2O$] in 100 cc of water. The resulting mixture was evaporated to dryness on an evaporation dish until the evolution of ammonium nitrate and nitrogen dioxide was ceased. The solid matter obtained was packed into a U-shaped stainless steel pipe, and calcined for 16 hours at a temperature of 540°C. by heating from outside while passing air at a flow rate of 100 cc/minute. Manganese molybdate ($MnMoO_4$) having a molybdenum-manganese atomic ratio of 1 : 1 was obtained.

The bismuth antimonate obtained in Example 10 and the manganese molybdate so obtained were mixed at a weight of ratio of 60 : 40, and kneaded together with water on a mill. The paste-like matter obtained was dried for 16 hours at a temperature of 130°C., and the sizes of the resulting particles were adjusted to 14–20 mesh (a Tyler's standard sieve) to form a catalyst.

Eight cubic centimeters of the catalyst so obtained was packed into a U-shaped stainless steel reaction tube having an inner diameter of 6 mm. A gaseous mixture of propylene, ammonia, water vapor and air at a molar ratio of 1 : 1 : 2 : 7.5 was introduced at a flow rate of 80.5 cc/minute, and catalytically reacted at a temperature of 470°C. The contact time was 5.97 seconds.

The conversion of propylene was 60.6 percent, and the selectivity of each product was as follows:

| Acrylonitrile | 85.0 % |
|---|---|
| Acetonitrile | 5.4 % |
| Hydrogen cyanide | 0.9 % |
| Acrolein | 1.6 % |

The formation of propionitrile and acetone was only in trace amounts.

EXAMPLE 44

The ammoxidation of isobutylene was performed under the same conditions and using the same catalyst as set forth in Example 43 except that isobutylene was used instead of the propylene.

The conversion of isobutylene was 72.5 percent, and the selectivity of each product was as follows:

| Methacrylonitrile | 83.1 % |
|---|---|
| Acetonitrile | 4.9 % |
| Hydrogen cyanide | 1.3 % |
| Methacrolein | 1.0 % |

EXAMPLE 45 to 48

The ammoxidation of propylene was performed under the same conditions as set forth in Example 43 except that the ratio of bismuth antimonate ($BiSbO_4$) to manganese molybdate ($MnMoO_4$) was varied as indicated in Table 8. The results obtained are shown in Table 8.

TABLE 8

| ex. | Component ratio of the catalyst (wt.%) BiSbO₄ | MnMoO₄ | Conversion of propylene (%) | Selectivities of the reaction products(%) acrylonitrile | acetonitrile | hydrogen cyanide | acrolein |
|---|---|---|---|---|---|---|---|
| 45 | 80 | 20 | 58.3 | 79.6 | 3.3 | 0.3 | 1.1 |
| 46 | 70 | 30 | 60.3 | 83.0 | 4.2 | 1.2 | 1.2 |
| 47 | 50 | 50 | 58.2 | 84.8 | 5.6 | 0.8 | 1.1 |
| 48 | 40 | 60 | 58.0 | 83.6 | 3.8 | 0.7 | 1.3 |

The formation of propionitrile and acetone was only in trace amounts.

EXAMPLES 49 to 52

The ammoxidation of propylene was performed under the same conditions as set forth in Example 43 except that iron molybdate was used instead of the manganese molybdate. The results obtained are shown in Table 9.

The iron molybdate [$Fe_2(MoO_4)_3$] was prepared as follows

A solution of 88.3 gr. of ammonium molybdate [$(NH_4)_6 Mo_7O_{24}\cdot 4H_2O$] in 260 cc of water was heated to a temperature of 80° to 90°C., followed by addition of a solution of 135 gr. of iron nitrate [$Fe(NO_3)_3\cdot 9H_2O$] in 135 cc of water. The resulting mixture was evaporated to dryness on an evaporation dish until the evolution of ammonium nitrate and nitrogen dioxide was ceased. The solid matter obtained was calcined under the same conditions as employed in the preparation of the manganese molybdate in Example 43. A catalyst composed of bismuth antimonate and iron molybdate was obtained.

TABLE 9

| ex. | Component ratio of the catalyst (wt.%) BiSbO₄ | Fe₂(MoO₄)₃ | Conversion of propylene (%) | Selectivities of the reaction products(%) acrylonitrile | acetonitrile | hydrogen cyanide | acrolein |
|---|---|---|---|---|---|---|---|
| 49 | 80 | 20 | 38.3 | 87.8 | 4.3 | 1.3 | 1.2 |
| 50 | 70 | 30 | 41.6 | 85.1 | 4.6 | 1.6 | 1.5 |
| 51 | 60 | 40 | 45.6 | 84.9 | 5.3 | 1.8 | 1.5 |
| 52 | 50 | 50 | 41.6 | 83.2 | 6.9 | 2.0 | 1.8 |

The formation of propionitrile and acetone was only in trace amounts.

EXAMPLES 53 to 57

The ammoxidation of propylene was performed under the same conditions as set forth in Example 43 except that cobalt molybdate prepared in the manner described below was used instead of the manganese molybdate. The results obtained are shown in Table 10 below.

The preparation of cobalt molybdate ($CoMo_3O_{10}$) was as follows

A solution of 88.3 gr. of ammonium molybdate [$(NH_4)_6MO_7O_{24}\cdot 4H_2O$] in 260 cc of water was heated to a temperature of 80° to 90°C., followed by addition of a solution of 48.5 gr. of cobalt nitrate [$(Co(NO_3)_2\cdot 6H_2O$] in 50 cc of water. The resulting mixture was evaporated to dryness on an evaporation dish until the evolution of ammonium nitrate and nitrogen dioxide was ceased. The solid matter obtained was calcined under the same conditions as employed in the preparation of manganese molybdate in Example 43. A catalyst composed of bismuth antimonate and cobalt molybdate was obtained.

TABLE 10

| ex. | Component ratio of the catalyst (wt.%) BiSbO$_4$ | CoMo$_3$O$_{10}$ | Conversion of propylene (%) | Selectivities of the reaction products(%) acrylonitrile | acetonitrile | hydrogen cyanide | acrolein |
|---|---|---|---|---|---|---|---|
| 53 | 90 | 10 | 42.3 | 70.3 | 6.3 | 1.8 | 1.0 |
| 54 | 80 | 20 | 46.3 | 79.3 | 4.1 | 1.2 | 0.8 |
| 55 | 70 | 30 | 49.6 | 82.9 | 3.2 | 1.4 | 1.2 |
| 56 | 60 | 40 | 55.3 | 78.0 | 3.4 | 1.5 | 1.3 |
| 57 | 50 | 50 | 53.6 | 76.4 | 4.1 | 1.2 | 1.6 |

The formation of propionitrile and acetone was only in trace amounts.

EXAMPLE 58

The ammoxidation of isobutylene was performed under the same conditions as set forth in Example 55 except that isobutylene was used instead of the propylene.

The conversion of isobutylene was 62.3 percent, and the selectivity of each product was as follows:

| Methacrylonitrile | 80.3 % |
| Acetonitrile | 3.6 % |
| Hydrogen cyanide | 1.0 % |
| Methacrolein | 1.6 % |

EXAMPLE 59

Eight cubic centimeters of the same catalyst as used in Example 55 was packed into a U-shaped stainless steel reation tube having an inner diameter of 6 mm. A gaseous mixture of propylene, ammonia, water vapor, and air at a molar ratio of 1 : 1 : 1 : 10 was introduced at a flow rate of 130 cc/minute, and catalytically reacted at a temperature of 450°C. The contact time was 3.69 seconds.

The conversion of propylene was 36.9 percent, and the selectivity of each product was as follows:

| Acrylonitrile | 84.6 % |
| Acetonitrile | 3.2 % |
| Hydrogen cyanide | 1.6 % |
| Acrolein | 0.8 % |

We claim:

1. A process for producing acrylonitrile or methacrylonitrile which comprises contacting propylene or isobutylene, ammonia and oxygen in a gaseous phase with a solid oxidation catalyst at a temperature within the range of from 350° to 600°C., said solid oxidation catalyst consisting essentially of
   a. bismuth antimonate of the formula BiSbO$_4$, and
   b. a salt of molybdic acid of the formula $M(MoO_4)_{m/2}$ or $M(Mo_3O_{10})_{m/2}$
wherein M is a metal of Group I$b$ of the Periodic Table, a metal of Group II$a$, a metal of Group II$b$, a metal of Group VIII, manganese or lead, and $m$ is a number equal to the atomic valency of the metal, the weight ratio of (a) to (b) being 95:5 to 10:90.

2. The process of claim 1 wherein said salt of molybdic acid is selected from Ag$_2$MoO$_4$, BaMoO$_4$, BaMo$_3$O$_{10}$ CaMoO$_4$, CaMo$_3$O$_{10}$, ZnMoO$_4$, CdMoO$_4$, Fe$_2$(MoO$_4$c]3, CoMo$_3$O$_{10}$, MnMoO$_4$, and PbMoO$_4$.

3. The process of claim 1 wherein said salt of molybdic acid is barium molybdate having a barium-molybdenum atomic ratio of 1:1 or 1:3.

4. The process of claim 1 wherein said salt of molybdic acid is calcium molybdate having a calcium-molybdenum atomic ratio of 1:1 or 1:3.

5. The process of claim 1 wherein said salt of molybdic acid is zinc molybdate having a zinc-molybdenum atomic ratio of 1:1.

6. The process of claim 1 wherein said salt of molybdic acid is iron molybdate having an iron-molybdenum atomic ratio of 2:3.

7. The process of claim 1 wherein said weight ratio of bismuth antimonate (a) to salt of molybdic acid (b) is in the range of 80:20 to 20:80.

* * * * *